United States Patent [19]

Snow

[11] Patent Number: 5,340,552

[45] Date of Patent: Aug. 23, 1994

[54] REACTIVE MATRIX FOR REMOVING IMPURITIES FROM HYDRIDE AND INERT GASES AND PROCESS

[75] Inventor: James T. Snow, Nashua, N.H.

[73] Assignee: Millipore Corporation, Bedford, Mass.

[21] Appl. No.: 943,355

[22] Filed: Sep. 10, 1992

[51] Int. Cl.$^5$ ............................ C01B 3/56; C08F 6/00
[52] U.S. Cl. ..................... 423/210; 423/219; 423/223; 423/240 R; 525/333.2; 525/328.2; 525/327.2; 525/357; 525/366; 549/272; 549/277
[58] Field of Search ............... 423/210, 219, 223, 240; 525/333.2, 328.2, 328.4, 327.2, 357, 366, 428.06; 549/272, 277

[56] References Cited

U.S. PATENT DOCUMENTS

| | | | |
|---|---|---|---|
| 4,070,286 | 1/1978 | Iler et al. | 55/67 |
| 4,286,068 | 8/1981 | Mares et al. | 549/272 |
| 4,455,288 | 6/1984 | Salter et al. | 423/612 |
| 4,603,148 | 7/1986 | Tom | 521/31 |
| 4,741,780 | 5/1988 | Atkinson | 106/413 |
| 4,909,852 | 3/1990 | Atkinson | 106/436 |

OTHER PUBLICATIONS

Advanced Organic Chemistry, 3rd ed. New York, Plenum Press, 1990. pp. 370–371. QD251.2C36 1990.

*Primary Examiner*—Michael Lewis
*Assistant Examiner*—Wendy Lovern
*Attorney, Agent, or Firm*—Andrew T. Karnakis; Paul J. Cook

[57] ABSTRACT

A macroreticulate polymer is provided for removing water vapor and oxidants from a gas having the formula:

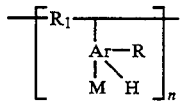

wherein Ar is a heteroaromatic moiety, M is bonded to the heteroaromatic moiety and is selected from the group consisting of lithium, sodium, potassium, alkyl magnesium, alkyl zinc, and dialkylaluminum, R is an organic moiety and $R_1$ is a polymerized moiety forming the molecular backbone of said polymer.

5 Claims, No Drawings

REACTIVE MATRIX FOR REMOVING IMPURITIES FROM HYDRIDE AND INERT GASES AND PROCESS

BACKGROUND OF THE INVENTION

This invention relates to a reactive polymeric scavenger for the room temperature removal of water and oxidant impurities from hydride or inert gases and to a process for purifying hydride or inert gases. More particularly, this invention relates to a polymeric scavenger containing reactive heteroatom functionalities containing reactive metallic species for removing water, oxidant and other impurities from hydride or inert gases.

At the present time, numerous industries require the use of purified gases in their processes. Even ppm or ppb levels of contaminants can have deleterious effects on the appearance or performance of certain products. For example, the grain structure of deposited silicon films can be significantly degraded by elevated oxygen levels in the reactor. Because of this and other adverse effects, the purification of process and purge gases in the microelectronics industry has found widespread acceptance and usage. The two principal methodologies for the point-of-use (pou) purification of inert and hydride gases are the room temperature removal of the gas impurities with an organometallic species on a high surface area support and the elevated temperature reaction with a metal alloy getter. The ideal purification material removes the unwanted impurities without generating volatile by-products that would contaminant the gas. It would be advantageous to have a high surface area support or membrane that in itself is the reactive species rather than attempting to deposit an uniform layer of reactive species onto a support. The purification material and resulting by-products should not be volatile under vacuum or pressurized flow conditions. Ideally, the purification material would operate at room temperature and not require electrical power for operation.

U.S. Pat. Nos. 4,603,148 and 4,604,270 describe a scavenger for purifying inert fluids consisting of a macroreticular support containing numerous pendant metallated functional groups corresponding to the general formula:

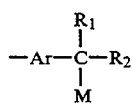

where Ar is an aromatic group radical containing one to three rings, $R_1$ and $R_2$ can be the same or different and can be hydrogen or an alkyl group of 1-12 carbon atoms, methylene-bridged benzophenone, fluorenone or alkali or alkaline earth salts of these radicals and M is a reactive metal, e.g., lithium, sodium, potassium, alkyl magnesium, or alkyl zinc. The excess organometallic reagent utilized to metallate the pendant organic groups of the polymer is located within the pores of the polymer. These excess metallating agents in this purification material will generate hydrocarbon impurities upon reaction with the water impurity in the gas to be purified. Although the excess metallating agents can be converted to metal hydrides through a thermal treatment, the resulting metal hydrides will liberate hydrogen upon water removal from the gas stream.

U.S. Pat. No. 4,659,552 describes a scavenger for purifying arsine and phosphine consisting of the product of the reaction of arsine or phosphine with a macroreticular support containing pendant functional groups having the formula:

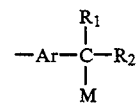

wherein Ar is an aromatic hydrocarbon having one to three rings, $R_1$ and $R_2$ can be the same or different and can be hydrogen or an alkyl group of 1-12 carbon atoms, and M is lithium, sodium, or potassium. Reactive organometallic species are located within these pores of the polymer. These scavengers have the same undesirable characteristics as do the scavengers described in U.S. Pat. Nos. 4,603,148 and 4,604,270.

U.S. Pat. No. 4,761,395 describes a scavenger for purifying arsine, phosphine, ammonia and inert gases that consists of an anion which is reactive to gaseous impurities that is non-covalently deposited onto a support. The anion is selected from carbanions whose corresponding protonated forms have pKa values of 22-36 and anions formed by the reaction of these carbanions with the primary component of the gas. Although this scavenger will not have a hydrocarbon emission problem as with the previously discussed purification materials, there is the potential for volatilization of the protonated carbanion under vacuum or pressurized flow conditions. It would be more advantageous to have the support material itself be the reactive species, since the vapor pressure would be much lower. In addition, there is the potential for loss of surface area or obstruction of pores from the deposition of the reactive carbanion onto the high surface area support.

Chichibabin, A. E.; Seide, O. *J. Russ. Phys. Chem Soc.*, 1914, 46, 1216 originally discovered the conversion of pyridine to 2-aminopyridine using sodium amide via an intermediate metal derivative. It was later found that organolithium compounds (RLi) would undergo addition reactions to nitrogen containing heterocyclic aromatic compounds to produce the lithiated products as depicted below for the pyridine case:

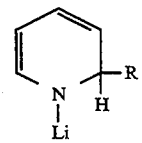

These pyridyl intermediates have been isolated and characterized by Giam, C. S.; Stout; J. L. *J. Chem. Soc., Chem. Commun.* 1969, 142 and others. These intermediates have found some applications as reducing agents for ketones (Abramovitch, R. A.; Marsh, W. C.; Saha, J. G., *Can. J. Chem.* 1965, 43, 2631), and for the formation of substituted heterocycles via carboxylation of the intermediate with carbon dioxide (Doyle, P.; Yates, R. R. J. *Tetrahedron Lett.* 1970, 38, 3371).

It would be desirable to provide a composition suitable for purifying gases while avoiding the production of volatile by-products. Furthermore, it would be desirable to provide such a composition which is effective for use at a normal operating condition and room temperature.

SUMMARY OF THE INVENTION

The present invention provides a reactive polymeric scavenger useful in removing water and oxidant impurities as well as other impurities, e.g. $H_2S$ and HCl (g), from hydride gases or inert gases. The polymeric scavenger is formed from a macroreticular polymer having heteroatom functionality. The polymeric scavenger is represented by the following formula:

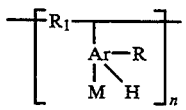

wherein Ar is any aromatic moiety of 1-3 rings containing one or more heteroatoms selected from nitrogen, oxygen, phosphorus, or sulfur, M is sodium, lithium or potassium bonded to the heteroatom, R is an organic moiety derived from an organometallic reagent utilized to react with a polymer having heteroaromaticity and $R_1$ is the polymerized moiety of the polymer. The gas containing the impurities is contacted with the macroreticulate polymeric scavenger of this invention to remove water and oxidant impurities from the gas. The contact can be effected at normal room temperature.

DESCRIPTION OF SPECIFIC EMBODIMENTS

The polymeric scavengers of this invention are desired by addition reactions across the heteroatom functionality, e.g., pyridyl and quinolyl groups, and are not derived by acid-base reactions. Thus, the potentially severe limitations of thermodynamics and complex equilibria imposed with strong acid/base driven reactions are eliminated. The polymeric scavengers of this invention do not have the vapor pressure limitations of scavengers formed by depositing an organic compound upon a support since the actual support is the reactive species. The polymeric scavengers of this invention maintain reactivity toward oxygen even after water removal.

The polymeric scavengers of this invention are represented by the general formula:

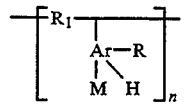

wherein Ar is any aromatic moiety containing one or more heteroatoms selected from nitrogen, phosphorus, oxygen or sulfur and containing from one to three rings. A pyridyl ring containing the nitrogen heteroatom is preferred. M is lithium, sodium or potassium, alkyl magnesium, alkyl zinc, or dialkyaluminum, preferably lithium. In the cases where M is an organometal, metal hydride or mixed hydride generation of undesired by-products will result upon impurity removal. R is alkyl, aryl or aralkyl from 1 to 12 carbon atoms such as methyl, butyl or $NR_2$ where R is hydrogen, alkyl, aryl or mixtures thereof. $R_1$ is the polymerizable moiety of the monomer or prepolymer such as vinyl.

The polymerized moiety is macroreticulate and is not degraded by the metallating agent when reacted with the base polymer to form the polymeric scavenger of this invention. The pores of the polymeric scavenger of this invention are typically between about 100 and 2000 angstroms.

The polymeric scavengers of this invention are formed by reacting a polymer having pendant heteroaromatic moieties or heteroatoms with an organometallic compound. Representative suitable polymers include polypyridines such as poly(4-vinylpyridine), poly(2-vinylpyridine), polyquinolines such as poly(4-vinylquinoline), poly(2-vinylquinoline) and analogs thereof. These polymers can be crosslinked with suitable crosslinking agents, if desired.

Representative suitable metallating agents include alkyl, aryl, and aralkyl lithium compounds, alkyl sodium, alkyl potassium, dialkyl magnesium, alkyl magnesium halide, dialkyl zinc, trialkyl aluminum where the alkyl moiety contains from 1 to 12 carbon atoms.

The metallation reaction is conducted by contacting the porous polymer reactant with a solution of the metallating agent in an inert solvent such as aliphatic hydrocarbons, aromatic hydrocarbons, ethers or the like. Typical contact times are between about 1 and 12 hours at a temperature between about 0° C. and 25° C.

The formation and use of the polymeric scavengers of this invention are illustrated by Equation I utilizing poly(4-vinylpyridine).

Equation I

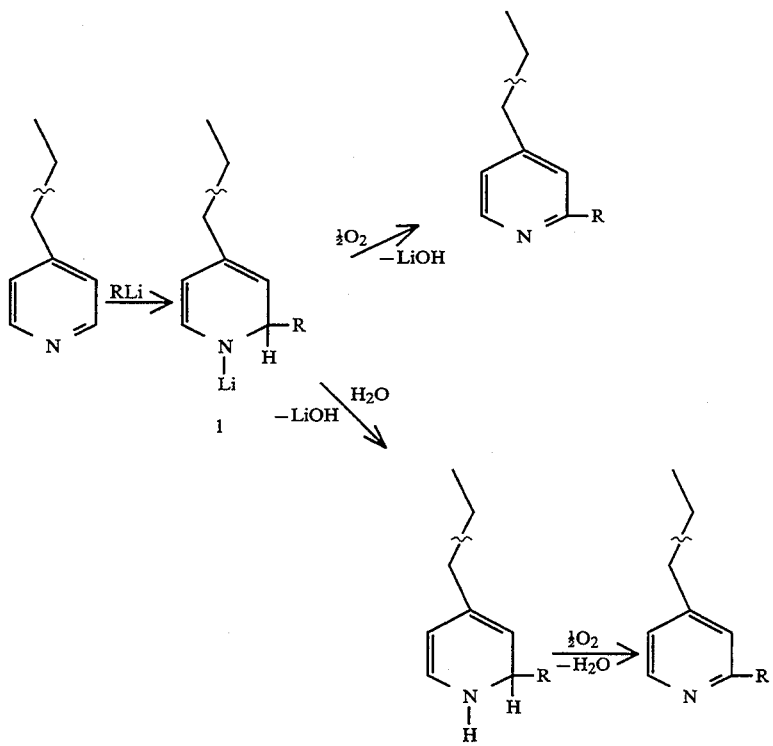

It is known that certain organometallic compounds such as organolithiums, exist as oligomers, i.e., dimers, tetramers, hexamers, etc. in solutions and in the solid state. These oligomers have the potential for contaminating the purified gas stream via generation of volatile hydrocarbon by-products. The degree of association can be affected by the presence of metal solvating compounds. For example, n-butyllithium exists as a hexamer in hydrocarbon solvents, but as a tetramer in diethyl ether. The use of chelating agents, e.g., N, N, N', N'-tetramethylethylenediamine (TMEDA), has been used to disrupt the degree of oligomeric formation. In the preparation of the polymer scavenger of this invention, an equivalent amount of organometallic reagent is reacted with the heteroaromatic support or membrane. The heteroatoms present assist in disrupting the oligomeric organolithium reagent. This chelation and the use of an equivalent quantity of organolithium will prevent the accumulation of unreacted organolithium which could contaminate the gas to be purified.

Representative gases which are purified by removing water or an oxidant include inert gases such as argon, helium or the like and hydride gases such as arsine, phosphine, ammonia or diborane. In use, the gas is passed through a bed of particulate polymeric scavenger or scavenger membrane. Typical scavenger particle sizes are between about 18 and 50 mesh.

The following examples illustrate the present invention and are not intended to limit the same.

EXAMPLE 1

A heteroaromatic polymer lithiated by n-butyllithium is prepared according to the following procedure: A crosslinked poly(4-vinylpyridine), e.g., Reillex 425 manufactured by Reilly Industries, Inc., is slurried with 50% methanol, washed with three bed volumes of deionized water, one bed volume of 100% methanol, and dried in vacuo at 70° C. for 12 hours. Hexane is distilled from sodium/benzophenone the day of use.

A 500-mL 3-necked flask equipped with an overhead mechanical stirrer and pressure-equalizing addition funnel is flame dried under argon. The flask is charged with Reillex 425 (17.27 g) and hexane (120 mL). The slurry is cooled using an ice/water bath and n-butyllithium (70 mL, 1.6M solution in hexane) is added dropwise with stirring over one hour. The resulting mixture is stirred at room temperature overnight. The solvent is removed by cannulation and the lithiated polymer is washed with 3×20 mL hexane and dried at room temperature under vacuum for four hours.

EXAMPLE 2

A crosslinked poly(4-vinylpyridine) lithiated by phenyllithium is prepared according to the following procedure: Reillex 425 is washed and dried according to the procedure detailed in Example One. Toluene is distilled from sodium onto 4Å molecular sieves.

A 500-mL 3-necked flask equipped with an overhead mechanical stirrer and pressure-equalizing addition funnel is flame dried under argon. The flask is charged with Reillex 425 (10.17 g) and toluene (70 mL). The slurry is cooled using an ice/water bath and phenyllithium (35 mL, 1.8M solution in 70:30 cyclohexane:diethyl ether) is added dropwise with stirring over one hour. The resulting mixture is stirred at room temperature overnight. The solvent is removed by cannulation and the lithiated polymer is washed with 3×20 mL toluene and dried at room temperature under vacuum for four hours.

EXAMPLE 3

A crosslinked poly(4-vinylpyridine), previously ground using a mortar and pestle, lithiated by n-butyllithium is prepared according to the following procedure: Reillex 425, previously washed and dried according to the procedure detailed in Example One, is ground using a mortar and pestle and dried at 80° C. in vacuo for four hours. Hexane is distilled from sodium/benzophenone the day of use.

A 500-mL 3-necked flask equipped with a magnetic stirring bar and pressure-equalizing addition funnel is flame dried under argon. The flask is charged with Reillex 425 (20.44 g) and hexane (120 mL). The slurry is cooled using an ice/water bath and n-butyllithium (80 mL, 1.6M solution in hexane) is added dropwise with stirring over 2.5 hours. The resulting mixture is stirred at room temperature overnight. The solvent is removed by cannulation and the lithiated polymer is washed with 3×20 mL hexane and dried at room temperature under vacuum for four hours.

EXAMPLE 4

This example demonstrates the use of the n-butyllithium functionalized heteroaromatic polymer for the removal of oxygen from an inert gas stream.

A 10-mL sample tube is filled with the functionilized poly(4-vinylpyridine) prepared in Example 1. A test gas mixture of 52 ppm oxygen in nitrogen is passed through the sample tube at 30 psig and 1.01 pm and the resulting oxygen concentration measured using a Panametrics 1/02 detector. After 740 minutes, oxygen breakthrough is detected by the Panametrics detector to provide an oxygen capacity for the lithiated polymer of 3.8 L $O_2$/L bed.

EXAMPLE 5

This example demonstrates the use of the phenyllithium functionalized poly(4-vinylpyridine) polymer for the removal of oxygen from an inert gas stream.

A 10-mL sample tube is filled with the functionalized poly(4-vinylpyridine) prepared in Example 2. A test gas mixture of 54 ppm oxygen in nitrogen is passed through the sample tube at 30 psig and 1.01 pm and the resulting oxygen concentration measured using a Panametrics 1/02 detector. After 2056 minutes, oxygen breakthrough is detected by the Panametrics detector to provide an oxygen capacity for the lithiated polymer of 11 L $O_2$/L bed.

EXAMPLE 6

This example demonstrates the use of the ground n-butyllithium functionalized poly(4-vinylpyridine) polymer for the removal of oxygen from an inert gas stream.

A 10-mL sample tube is filled with the ground functionalized poly(4-vinylpyridine) prepared in Example 3. A test gas mixture of 50 ppm oxygen in nitrogen is passed through the sample tube at 30 psig and 1.01 pm and the resulting oxygen concentration measured using a Panametrics 1/02 detector. After 662 minutes, oxygen breakthrough is detected by the Panametrics detector to provide an oxygen capacity for the lithiated polymer of 3.3 L $O_2$/L bed.

I claim:

1. A macroreticulate polymer for removing a composition selected from the group consisting of water vapor, oxygen, and mixtures thereof from a gas, said polymer having the formula:

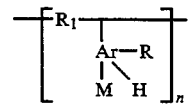

wherein Ar is a heteroaromatic moiety containing nitrogen as the heteroatom, M is bonded to the nitrogen heteroatom and is selected from the group consisting of lithium, sodium and potassium, R is selected from the group consisting of an organic moiety and an amino moiety and $R_1$ is a polymerized moiety forming a molecular backbone of said polymer, said polymer being free of a composition which releases a volatile moiety upon contact with water or oxygen at room temperature.

2. The polymer of claim 1 wherein M is lithium.
3. The polymer of claim 1 wherein $R_1$ is polyvinyl.
4. The polymer of claim 2 wherein $R_1$ is polyvinyl.
5. The process of purifying a gas selected from the group consisting of an inert gas and a hydride to remove a composition selected from the group consisting of water vapor, oxygen and mixtures thereof from said gas which comprises contacting said gas with the polymer of any one of claims 1, 2, 3 or 4 and recovering said gas after contact with said polymer.

* * * * *